United States Patent
Zhong et al.

(10) Patent No.: US 11,398,053 B2
(45) Date of Patent: Jul. 26, 2022

(54) MULTISPECTRAL CAMERA EXTERNAL PARAMETER SELF-CALIBRATION ALGORITHM BASED ON EDGE FEATURES

(71) Applicant: DALIAN UNIVERSITY OF TECHNOLOGY, Liaoning (CN)

(72) Inventors: Wei Zhong, Liaoning (CN); Boqian Liu, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/279,461

(22) PCT Filed: Mar. 5, 2020

(86) PCT No.: PCT/CN2020/077951
§ 371 (c)(1),
(2) Date: Mar. 24, 2021

(87) PCT Pub. No.: WO2021/098080
PCT Pub. Date: May 27, 2021

(65) Prior Publication Data
US 2022/0036589 A1    Feb. 3, 2022

(30) Foreign Application Priority Data

Nov. 22, 2019  (CN) .......................... 201911152421.5

(51) Int. Cl.
*G06T 7/80*   (2017.01)
*G06T 7/13*   (2017.01)
(Continued)

(52) U.S. Cl.
CPC .................. *G06T 7/85* (2017.01); *G06T 7/13* (2017.01); *H04N 13/156* (2018.05);
(Continued)

(58) Field of Classification Search
CPC ........... G06T 7/85; G06T 7/13; H04N 13/156; H04N 13/239; H04N 13/25
(Continued)

(56) References Cited

U.S. PATENT DOCUMENTS

2010/0302366 A1   12/2010   Zhao
2021/0152812 A1*   5/2021   Ota .................... G02B 27/0101

FOREIGN PATENT DOCUMENTS

CN    105701827 A    6/2016
CN    108492335 A    9/2018
(Continued)

*Primary Examiner* — On S Mung
(74) *Attorney, Agent, or Firm* — Muncy, Geissler, Olds & Lowe, P.C.

(57) ABSTRACT

The present invention discloses a multispectral camera external parameter self-calibration algorithm based on edge features, and belongs to the field of image processing and computer vision. Because a visible light camera and an infrared camera belong to different modes, fewer satisfactory point pairs are obtained by directly extracting and matching feature points. In order to solve the problem, the method starts from the edge features, and finds an optimal corresponding position of an infrared image on a visible light image through edge extraction and matching. In this way, a search range is reduced and the number of the satisfactory matched point pairs is increased, thereby more effectively conducting joint self-calibration on the infrared camera and the visible light camera. The operation is simple and results are accurate.

8 Claims, 2 Drawing Sheets

(51) Int. Cl.
*H04N 13/156* (2018.01)
*H04N 13/239* (2018.01)
*H04N 13/25* (2018.01)

(52) U.S. Cl.
CPC ........... *H04N 13/239* (2018.05); *H04N 13/25* (2018.05); *G06T 2207/10012* (2013.01); *G06T 2207/10048* (2013.01)

(58) Field of Classification Search
USPC .......................................................... 348/47
See application file for complete search history.

(56) References Cited

FOREIGN PATENT DOCUMENTS

| CN | 109146930 A | 1/2019 |
| CN | 109389630 A | 2/2019 |
| KR | 101806045 B1 | 12/2017 |

\* cited by examiner

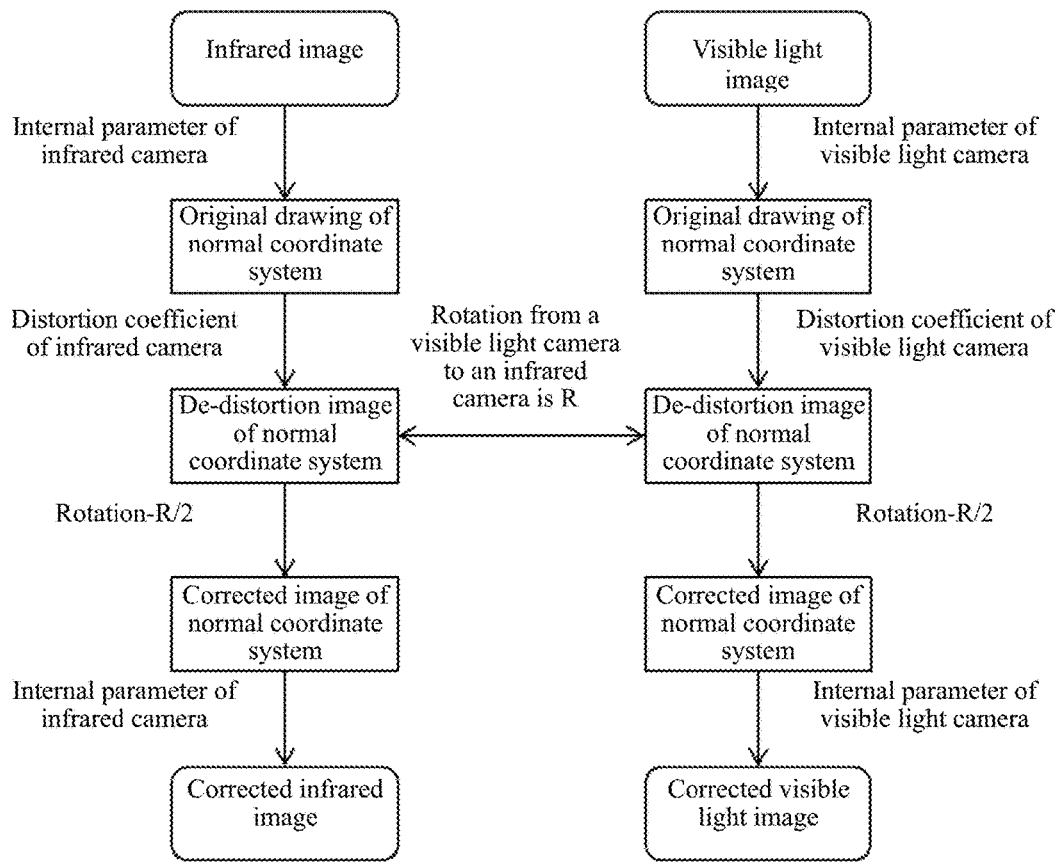
Fig. 2
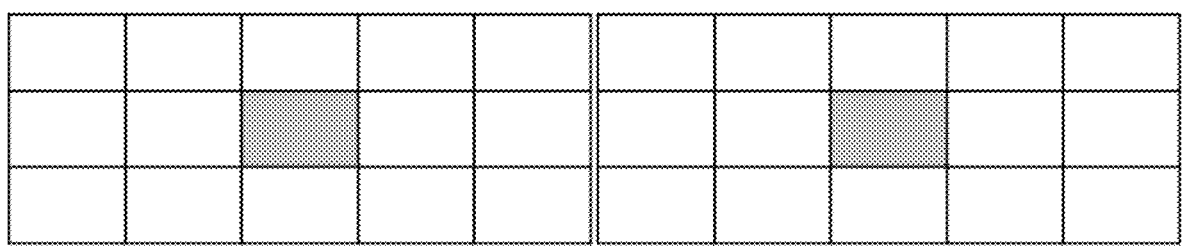
Fig.3(a)                                        Fig.3(b)

MULTISPECTRAL CAMERA EXTERNAL PARAMETER SELF-CALIBRATION ALGORITHM BASED ON EDGE FEATURES

TECHNICAL FIELD

The present invention belongs to the field of image processing and computer vision, and relates to extraction and matching of feature points from photographed infrared scene images and visible light scene images, and correction of a positional relationship between an infrared camera and a visible light camera according to the matched feature points, thereby solving the problem of change in external parameters of the infrared camera and the visible light camera caused by temperature and vibration.

BACKGROUND

Infrared is an electromagnetic wave with a wavelength between microwave and visible light, and its wavelength is longer than that of red light. Substances higher than absolute zero (−273.15° C.) can generate infrared rays. Infrared images are widely used in different fields such as military and national defense, resource exploration, weather forecasting, environmental monitoring, medical diagnosis and treatment and marine research due to the capability of observation through fog and rain. The infrared can be used to shoot scenes through mist and smoke, and can also be used for infrared photography at night. An infrared camera has the advantage of imaging in extreme scenes (low light, rain, snow and dense fog), and has the disadvantages of low resolution and blurred image details. In contrast, a visible light camera has the advantages of high resolution and clear image details, but cannot be used for imaging in the extreme scenes. Therefore, the combination of the infrared camera and the visible light camera has great practical significance.

Stereo vision is an important topic in the field of computer vision. The purpose is to reconstruct the 3D geometric information of the scenes. Binocular stereo vision is an important field of stereo vision. In the binocular stereo vision, left and right camera lenses are used to simulate two eyes. Depth images are calculated by calculating the difference between binocular images. The binocular stereo vision has the advantages of high efficiency, high accuracy, simple system structure and low cost. Because the binocular stereo vision needs to match the same point on the left and right image capture points, the focal length and image capture center of the two camera lenses of the camera, as well as a positional relationship between the left and right camera lenses shall be obtained. To obtain the above data, the camera needs to be calibrated. The acquisition of the positional relationship between the visible light camera and the infrared camera is called joint calibration.

In the calibration process, two camera lens parameters and relative position parameters of the camera are obtained, but these parameters are not stable. When temperature and humidity are changed, the internal parameters of the camera lenses are also changed. In addition, due to accidental camera collision, the positional relationship between the two camera lenses may be changed. Therefore, when the camera is used, internal and external parameters must be modified, which is self-calibration. When the internal parameters of the camera are known, the positional relationship between the infrared lens and the visible light lens is corrected by extracting the features of an infrared image and the features of a visible light image respectively, that is, the joint self-calibration of the infrared camera and the visible light camera.

SUMMARY

The present invention aims to solve the change of a positional relationship between an infrared camera and a visible light camera due to factors such as temperature, humidity and vibration. The edges of an infrared camera and a visible light camera are extracted and matched; feature points are selected from the matched edges; and an original calibration result is corrected according to the feature points.

The technical solution of the present invention is as follows:

A multispectral camera external parameter self-calibration algorithm based on edge features has a flow as shown in FIG. 1, and comprises the following steps:

1) Original image correction: conducting de-distortion and binocular correction on an original image according to internal parameters and original external parameters of the infrared camera and the visible light camera. The flow is shown in FIG. 2.

2) Scene edge detection: extracting the edges of an infrared image and a visible light image respectively.

3) Judging an optimal corresponding position of the infrared image on the visible light image: matching the edges of the infrared image with the edges of the visible light image, and determining the corresponding position according to a matching result.

4) Extracting and selecting an optimal matching point pair: extracting and selecting a satisfactory matching point pair according to the optimal corresponding position of the infrared image on the visible light image.

5) Judging a feature point coverage area: dividing the image into m*n grids; if the feature points cover all the grids, executing a next step; otherwise continuing to shoot the image and extracting the feature points.

6) Correcting the calibration result: using image coordinates of all the feature points to calculate the positional relationship between the two cameras after correction; and then superimposing with the original external parameters.

The specific steps of the step 1) are as follows:

1-1) Calculating the coordinates in a normal coordinate system corresponding to pixel points of the image, wherein the normal coordinate system is the projection of a camera coordinate system on the plane Z=1; the camera coordinate system is a coordinate system which takes the center of the camera as an origin of the image coordinate system, takes image directions as XY axis directions and takes a direction perpendicular to the image as Z axis direction; a pixel coordinate system takes the upper left corner of the image as an origin, and x-axis and y-axis of the pixel coordinate system are parallel to x-axis and y-axis of the image coordinate system, respectively; the unit of the pixel coordinate system is the pixel; the relationship between pixel coordinates and normal coordinates is as follows:

$$u = KX$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ 1 \end{bmatrix}$$

wherein $$u = \begin{bmatrix} u \\ v \\ 1 \end{bmatrix}$$

indicates the pixel coordinate of the image;

$$K = \begin{bmatrix} f_x & 0 & c_x \\ 0 & f_y & c_y \\ 0 & 0 & 1 \end{bmatrix}$$

indicates an internal parameter matrix of the camera; $f_x$ and $f_y$ respectively indicate the focal distances of the image in x direction and y direction; the unit is the pixel; $(c_x,c_y)$ indicates the principal point position of the camera, i.e., the corresponding position of the camera center on the image; and $$X = \begin{bmatrix} X \\ Y \\ 1 \end{bmatrix}$$

is a coordinate in the normal coordinate system. The normal coordinate system corresponding to the pixel points is calculated, i.e., $X=K^{-1}u$, through the known pixel coordinate system of the image and the internal parameters of the camera;

1-2) Removing image distortion: due to the limitation of a lens production process, a lens under actual conditions has some distortion phenomena, causing nonlinear distortion. Therefore, a pure linear model cannot accurately describe an imaging geometric relationship. The nonlinear distortion can be roughly classified into radial distortion and tangential distortion.

The radial distortion of the image is a position deviation of the image pixel points with the distortion center as the center point along the radial direction, thereby causing the distortion of the picture formed in the image. The radial distortion is roughly described as follows:

$$x_d = x(1+k_1 r^2 + k_2 r^4 + k_3 r^6)$$

$$y_d = y(1+k_1 r^2 + k_2 r^4 + k_3 r^6)$$

wherein $r^2 = x^2 + y^2$; $k_1$, $k_2$ and $k_3$ are radial distortion parameters.

The tangential distortion of the image is generated by the defect in the camera manufacturing that makes the lens not parallel to the image plane, and can be quantitatively described as:

$$x_d = x + (2p_1 xy + p_2(r^2 + 2x^2))$$

$$y_d = y + (p_1(r^2 + 2y^2) + 2p_2 xy)$$

wherein $p_1$ and $p_2$ are tangential distortion coefficients.

In conclusion, the coordinate relationship before and after distortion is as follows:

$$x_d = x(1+k_1 r^2 + k_2 r^4 + k_3 r^6) + (2p_1 xy + p_2(r^2 + 2x^2))$$

$$y_d = y(1+k_1 r^2 + k_2 r^4 + k_3 r^6) + (p_1(r^2 + 2y^2) + 2p_2 xy)$$

wherein (x,y) is a normal coordinate in an ideal state, and $(x_d,y_d)$ is an actual normal coordinate with distortion.

1-3) Reversing the two images according to the original rotation relationship between the two cameras: an original rotation matrix R and a translation vector t between the two cameras are known:

$$X_r = RX_l + t$$

wherein $X_l$ indicates the normal coordinate of the infrared camera, and $X_r$ indicates the normal coordinate of the visible light camera. The infrared image is rotated to positive direction of R by half an angle, and the visible light image is rotated to opposite direction of R by half an angle.

1-4) Restoring the de-distorted and rotated image to the pixel coordinate system according to the formula u=KX.

The step 3) specifically comprises the following steps:

3-1) Calculating a cross correlation coefficient of a visible light edge image and an infrared edge image by using a normalized cross-correlation matching method.

$$\rho(u,v) = \frac{\sum_{i=0}^{M}\sum_{j=0}^{N}(Im_{Oeu,v}(i,j) - Im_{IRe}(i,j))}{\sigma_{O_{u,v}}\sigma_{IR}}$$

wherein (u,v) indicates the position of the infrared edge image $Im_{IRe}$ relative to the visible light edge image $Im_{Oe}$; and $Im_{Oeu,v}$ indicates a part of $Im_{Oe}$ taking (u,v) as a starting point and having the same size as $Im_{IRe}$·$\sigma_{O_{u,v}}$ and $\sigma_{IR}$ respectively indicate standard deviations of corresponding images.

A group of points $\{(u_k,v_k)\}$ that maximize $\rho(u,v)$ are selected as candidate corresponding positions.

3-2) Rotating each candidate position for multiple times according to an angle range (for example, the range of −10° to 100 is divided into 200 parts, that is, rotating by 0.1° each time from −10° position), and selecting the corresponding position and rotation angle that maximize $\rho(u,v)$.

The step 4) specifically comprises the following steps:

4-1) Selecting the optimal corresponding position of the infrared image on the visible light image; translating and rotating the infrared image according to the result of step 3); and then detecting the feature points on the visible light image and the translated and rotated infrared image respectively.

4-2) Dividing the infrared image and visible light image areas into m×n blocks at the same time; for each feature point $p_i^l$ of the infrared image, finding a corresponding block $b_{x_i,y_i}^l$ of the feature point in the infrared image; recording the search range of the visible light image corresponding to the block $b_{x_i,y_i}$ as $\{P_i^r\}$, as shown in FIGS. 3(a) and 3(b); finding a variable which can describe the similarity of the feature points to assess the similarity of any point in $p_i^l$ and $\{P_i^r\}$; if a maximum similarity is greater than a threshold $t_1$, regarding the point as a rough matching point $p_i^r$.

4-3) If the maximum similarity $s_{first}$ and the second maximum similarity $s_{second}$ in $p_i^l$ and $\{p_i^r\}$ satisfy:

$$F(s_{first}, s_{second}) \geq t_2$$

reserving the matching, wherein $t_2$ is a threshold and $F(s_{first}, s_{second})$ is used for describing a relationship between $s_{first}$ and $s_{second}$.

After selection according to the rule, matching the corresponding feature point $p'_i^l$ of $p_i^r$ in the infrared image according to the steps 4-2) and 4-3); and reserving the matching $\langle p_i^l, p_i^r \rangle$ if $p'_i^l = p_i^l$ is satisfied.

4-4) Based on the infrared image feature point $p_i^l=(x_i^l,y_i^l)$, conducting parabolic fitting to optimize an integer pixel feature point $p_i^r=(x_i^r,y_i^r)$ corresponding to the visible light image, to obtain a sub-pixel feature point $p'{}_i^r=(x_i^r+j_{rx}^*,y_i^r+j_{ry}^*)$ corresponding to the visible light image, wherein $j_{rx}^*$ is a sub-pixel offset in x direction and $j_{ry}^*$ is a sub-pixel offset in y direction.

4-5) Based on the integer pixel feature point $p_i^r=(x_i^r,y_i^r)$ corresponding to the visible light image, calculating the sub-pixel feature point $p'{}_i^l=(x_i^l+j_{lx}^*,y_i^l+j_{ly}^*)$ corresponding to the infrared image according to the method of 4-4), wherein $j_{lx}^*$ is a sub-pixel offset in x direction and $j_{ly}^*$, is a sub-pixel offset in y direction.

4-6) Obtaining a final matching point pair as $\langle p'{}_i^l, p'{}_i^r \rangle$; and restoring $p'{}_i^l$ to the coordinates before rotation and translation of the infrared image according to the inverse process of step 4-1).

The step 6) specifically comprises the following steps:

6-1) Further screening the point pairs by using random sample consensus (RANSAC).

6-2) Solving a basic matrix F and an essential matrix E: a relationship between the pixel point pairs $u_l$ and $u_r$, corresponding to infrared light and visible light and the basic matrix F is:

$$u_r^T F u_l = 0$$

The coordinates of the corresponding points are substituted into the above formula to construct a homogeneous linear equation system to solve F.

A relationship between the basic matrix and the essential matrix is:

$$E = K_r^T F K_l$$

wherein $K_l$ and $K_r$ are respectively the internal parameter matrices of the infrared camera and the visible light camera.

6-3) Decomposing a relationship between rotation and translation from the essential matrix: the relationship between the essential matrix E and rotation R and translation t is as follows:

$$E = [t]_x R$$

wherein $[t]_x$ indicates a cross product matrix of t.

Conducting singular value decomposition on E to obtain:

$$E = U\Sigma V^T = U \begin{bmatrix} 1 & 0 & 0 \\ 0 & 1 & 0 \\ 0 & 0 & 0 \end{bmatrix} V^T$$

Defining two matrices $$Z = \begin{bmatrix} 0 & 1 & 0 \\ -1 & 0 & 0 \\ 0 & 0 & 0 \end{bmatrix}$$

and $$W = \begin{bmatrix} 0 & -1 & 0 \\ 1 & 0 & 0 \\ 0 & 0 & 1 \end{bmatrix},$$

$$ZW = \Sigma$$

Thus, writing E in the following two forms $$E = UZU^T UWV^T \quad (1)$$

setting $[t]_x = UZU^T, R = UWV^T$ $$E = -UZU^T UW^T V^T \quad (2)$$

setting $[t]_x = -UZU^T, R = UW^T V^T$ 6-4) Superimposing the decomposed relationship between rotation and translation into the original positional relationship between the infrared camera and the visible light camera.

The present invention has the beneficial effects: the present invention solves the change of the positional relationship between the infrared camera and the visible light camera due to factors such as temperature, humidity and vibration. The present invention has the advantages of high speed, accurate results and simple operation.

DESCRIPTION OF DRAWINGS

FIG. 2 is a flow chart of binocular correction.
FIG. 3(a) is a schematic diagram of an infrared block,
and FIG. 3(b) is a schematic diagram of a visible light block.

DETAILED DESCRIPTION

Figure 1:
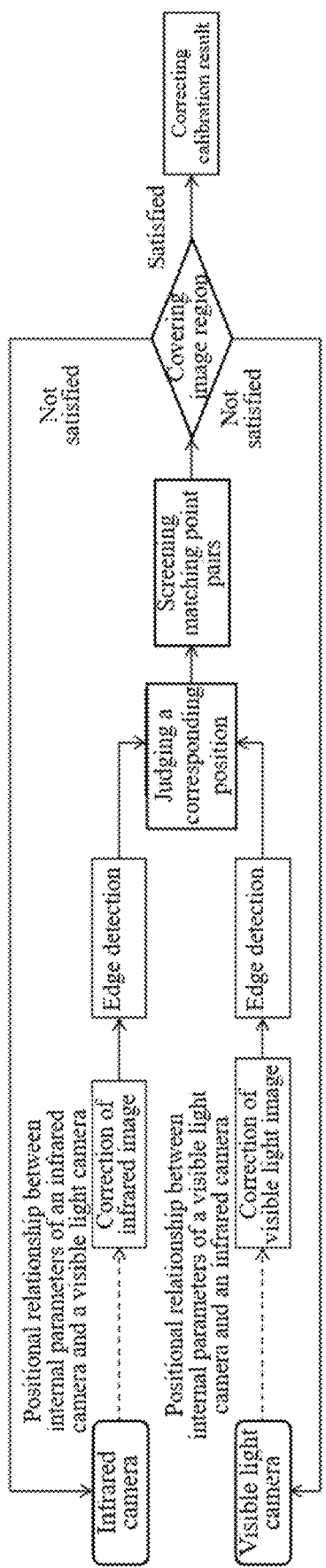
FIG. 1 is an entire flow chart.

The present invention aims to solve the change of a positional relationship between an infrared camera and a visible light camera due to factors such as temperature, humidity and vibration. The present invention will be described in detail below in combination with drawings and embodiments.

1) Original image correction: conducting de-distortion and binocular correction on an original image according to internal parameters and original external parameters of the infrared camera and the visible light camera. The flow is shown in FIG. 2.

1-1) Calculating the coordinates in a normal coordinate system corresponding to the pixel points of the image, wherein a pixel coordinate system takes the upper left corner of the image as an origin, and x-axis and y-axis of the pixel coordinate system are parallel to x-axis and y-axis of an image coordinate system, respectively; the unit of the pixel coordinate system is the pixel; the pixel is a basic and indivisible unit of image display; the normal coordinate system is the projection of a camera coordinate system on the plane Z=1; the camera coordinate system is a coordinate system which takes the center of the camera as an origin of the image coordinate system, takes image directions as XY axis directions and takes a direction perpendicular to the image as Z axis direction; the relationship between pixel coordinates and normal coordinates is as follows:

$$u = KX$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ 1 \end{bmatrix}$$

wherein $$u = \begin{bmatrix} u \\ v \\ 1 \end{bmatrix}$$

indicates the pixel coordinate of the image;

$$K = \begin{bmatrix} f_x & 0 & c_x \\ 0 & f_y & c_y \\ 0 & 0 & 1 \end{bmatrix}$$

indicates an internal parameter matrix of the camera; $f_x$ and $f_y$ respectively indicate the focal distances of the image in x direction and y direction (the unit is the pixel); $(c_x, c_y)$ indicates the principal point position of the camera, i.e., the corresponding position of the camera center on the image; and $$X = \begin{bmatrix} X \\ Y \\ 1 \end{bmatrix}$$

is a coordinate in the normal coordinate system. The normal coordinate system corresponding to the pixel points can be calculated, i.e., $$X=K^{-1}u$$

1-2) Removing image distortion: due to the limitation of a lens production process, a lens under actual conditions has some distortion phenomena, causing nonlinear distortion. Therefore, a pure linear model cannot accurately describe an imaging geometric relationship. The nonlinear distortion can be roughly classified into radial distortion and tangential distortion.

The radial distortion of the image is a position deviation of the image pixel points with the distortion center as the center point along the radial direction, thereby causing the distortion of the picture formed in the image. The radial distortion is roughly described as follows:

$$x_d = x(1+k_1 r^2 + k_2 r^4 + k_3 r^6)$$

$$y_d = y(1+k_1 r^2 + k_2 r^4 + k_3 r^6)$$

wherein $r^2 = x^2 + y^2$, $k_1$, $k_2$ and $k_3$ are radial distortion parameters.

The tangential distortion is generated by the defect in the camera manufacturing that makes the lens not parallel to the image plane, and can be quantitatively described as:

$$x_d = x + (2p_1 xy + p_2(r^2 + 2x^2))$$

$$y_d = y + (p_1(r^2 + 2y^2) + 2p_2 xy)$$

wherein $p_1$ and $p_2$ are tangential distortion coefficients.

In conclusion, the coordinate relationship before and after distortion is as follows:

$$x_d = x(1+k_1 r^2 + k_2 r^4 + k_3 r^6) + (2p_1 xy + p_2(r^2 + 2x^2))$$

$$y_d = y(1+k_1 r^2 + k_2 r^4 + k_3 r^6) + (p_1(r^2 + 2y^2) + 2p_2 xy)$$

wherein (x,y) is a normal coordinate in an ideal state, and $(x_d, y_d)$ is an actual normal coordinate with distortion.

1-3) Reversing the two images according to the original rotation relationship between the two cameras: an original rotation matrix R and a translation vector t between the two cameras are known:

$$X_r = RX_I + t$$

wherein $X_I$ indicates the normal coordinate of the infrared camera, and $X_r$ indicates the normal coordinate of the visible light camera. The infrared image is rotated to positive direction of R by half an angle, and the visible light image is rotated to opposite direction of R by half an angle.

1-4) Restoring the de-distorted and rotated image to the pixel coordinate system according to the formula u=KX.

2) Scene edge detection: extracting the edges of an infrared image and a visible light image respectively.

3) Judging an optimal corresponding position of the infrared image on the visible light image: matching the edges of the infrared image with the edges of the visible light image, and determining the corresponding position according to a matching result.

3-1) Calculating a cross correlation coefficient of a visible light edge image and an infrared edge image by using a normalized cross-correlation matching method.

$$\rho(u,v) = \frac{\sum_{i=0}^{M} \sum_{j=0}^{N} (Im_{Oeu,v}(i,j) - Im_{IRe}(i,j))}{\sigma_{O_{u,v}} \sigma_{IR}}$$

wherein (u,v) indicates the position of the infrared edge image $Im_{IRe}$ relative to the visible light edge image $Im_{Oe}$; and $Im_{Oeu,v}$ indicates a part of $Im_{Oe}$ taking (u,v) as a starting point and having the same size as $Im_{IRe}$. $\sigma_{O_{u,v}}$ and $\sigma_{IR}$ respectively indicate standard deviations of corresponding images.

A group of points $\{(u_k, v_k)\}$ that maximize $\rho(u,v)$ are selected as candidate corresponding positions.

3-2) Rotating each candidate position for multiple times according to an angle range; the range of −10° to 10° is divided into 200 parts, that is, rotating by 0.1° each time from −10° position, and selecting the corresponding position and rotation angle that maximize $\rho(u,v)$.

4) Extracting and selecting an optimal matching point pair: extracting and selecting a satisfactory matching point pair according to the optimal corresponding position of the infrared image on the visible light image.

4-1) Selecting the optimal corresponding position of the infrared image on the visible light image; translating and rotating the infrared image according to the result of step 3); and then detecting the feature points on the visible light image and the translated and rotated infrared image respectively.

4-2) Dividing the infrared image and visible light image areas into m×n blocks at the same time; for each feature point $p_i^l$ of the infrared image, finding a corresponding block $b_{x_i, y_i}^l$ of the feature point in the infrared image; recording the search range of the visible light image corresponding to the block $b_{x_i, y_i}^l$ as $\{P_i^r\}$, as shown in FIGS. 3(a) and 3(b); finding a variable which can describe the similarity of the feature points to assess the similarity of any point in $p_i^l$ and $\{P_i^r\}$; if a maximum similarity is greater than a threshold $t_1$, regarding the point as a rough matching point $p_i^r$.

4-3) If the maximum similarity $s_{first}$ and the second maximum similarity $s_{second}$ in $p_i^l$ and $\{p_i^r\}$ satisfy:

$$F(s_{first}, s_{second}) \geq t_2$$

reserving the matching, wherein $t_2$ is a threshold and $F(s_{first}, s_{second})$ is used for describing a relationship between $s_{first}$ and $s_{second}$.

After selection according to the rule, matching the corresponding feature point $p'_i^l$ of $p_i^r$ in the infrared image according to the above steps; and reserving the matching $\langle p_i^l, p_i^r \rangle$ if $p'_i^l = p_i^l$ is satisfied.

4-4) Based on the infrared image feature point $p_i^l = (x_i^l, y_i^l)$, conducting parabolic fitting to optimize an integer pixel feature point $p_i^r=(x_i^r,y_i^r)$ corresponding to the visible light image, to obtain a sub-pixel feature point $p'^r_i=(x_i^r+j_{rx}^*,y_i^r+j_{ry}^*)$ corresponding to the visible light image, wherein $j_{rx}^*$ is a sub-pixel offset in x direction and $j_{ry}^*$ is a sub-pixel offset in y direction.

4-5) Based on the integer pixel feature point $p_i^r=(x_i^r,y_i^r)$ corresponding to the visible light image, calculating the sub-pixel feature point $p'^l_i=(x_i^l+j_{lx}^*,y_i^r+j_{ly}^*)$ corresponding to the infrared image according to the method of 4-4), wherein $j_{lx}^*$ is a sub-pixel offset in x direction and $j_{ly}^*$ is a sub-pixel offset in y direction.

4-6) Obtaining a final matching point pair as $\langle p'^l_i, p'^r_i \rangle$; and restoring $p'^l_i$ to the coordinates before rotation and translation of the infrared image according to the inverse process of step 4-1).

5) Judging a feature point coverage area: dividing the image into m*n grids; if the feature points cover all the grids, executing a next step; otherwise continuing to shoot the image and extracting the feature points.

6) Correcting the calibration result: using image coordinates of all the feature points to calculate the positional relationship between the two cameras after correction; and then superimposing with the original external parameters.

6-1) Further screening the point pairs by using random sample consensus (RANSAC).

6-2) Solving a basic matrix F and an essential matrix E: a relationship between the pixel points $u_l$ and $u_r$ corresponding to infrared light and visible light and the basic matrix F is:

$$u_r^T F u_l = 0$$

The coordinates of the corresponding points are substituted into the above formula to construct a homogeneous linear equation system to solve F.

A relationship between the basic matrix and the essential matrix is:

$$E = K_r^T F K_l$$

wherein $K_l$ and $K_r$ are respectively the internal parameter matrices of the infrared camera and the visible light camera.

6-3) Decomposing a relationship between rotation and translation from the essential matrix: the relationship between the essential matrix E and rotation R and translation t is as follows:

$$E = [t]_x R$$

wherein $[t]_x$ indicates a cross product matrix of t.

Conducting singular value decomposition on E to obtain:

$$E = U\Sigma V^T = U \begin{bmatrix} 1 & 0 & 0 \\ 0 & 1 & 0 \\ 0 & 0 & 0 \end{bmatrix} V^T$$

Defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

Thus, writing E in the following two forms $$E = UZU^T UWV^T \quad (1)$$

$$\text{setting}[t]_x = UZU^T, R = UWV^T$$

$$E = -UZU^T UW^T V^T \quad (2)$$

$$\text{setting}[t]_x = -UZU^T, R = UW^T V^T$$

6-4) Superimposing the decomposed relationship between rotation and translation into the original positional relationship between the infrared camera and the visible light camera.

The invention claimed is:

1. A multispectral camera external parameter self-calibration algorithm based on edge features, comprising:
   obtaining an original image from an infrared camera and a visible light camera;
   conducting original image correction comprising conducting de-distortion and binocular correction on the original image according to internal parameters and original external parameters of the infrared camera and the visible light camera;
   conducting scene edge detection comprising extracting the edges of an infrared image from the infrared camera and a visible light image from the visible light camera respectively;
   judging an optimal corresponding position of the infrared image on the visible light image comprising matching the edges of the infrared image with the edges of the visible light image, and determining the corresponding position according to a matching result;
   extracting and selecting an optimal matching point pair comprising extracting and selecting a satisfactory matching point pair according to the optimal corresponding position of the infrared image on the visible light image;
   judging a feature point coverage area comprising dividing the image into m*n grids; if the feature points cover all the grids, executing a next step; otherwise continuing to shoot the image and extracting the feature points;
   correcting the calibration result using image coordinates of all the feature points to calculate the positional relationship between the two cameras after correction; and then superimposing into the original positional relationship between the infrared camera and the visible light camera.

2. The multispectral camera external parameter self-calibration algorithm based on edge features according to claim 1, wherein said original image correction further comprises:
   calculating the coordinates in a normal coordinate system corresponding to pixel points of the image, wherein a pixel coordinate system takes the upper left corner of the image as an origin, and x-axis and y-axis of the pixel coordinate system are parallel to x-axis and y-axis of an image coordinate system, respectively; the unit of the pixel coordinate system is the pixel; the normal coordinate system is the projection of a camera coordinate system on the plane Z=1; the camera coordinate system is a coordinate system which takes the center of the camera as an origin of the image coordinate system, takes image directions as XY axis directions and takes a direction perpendicular to the image as Z axis direction; the relationship between pixel coordinates and normal coordinates is as follows:

$$u = KX$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ 1 \end{bmatrix}$$

wherein $$u = \begin{bmatrix} u \\ v \\ 1 \end{bmatrix}$$

indicates the pixel coordinate of the image;

$$K = \begin{bmatrix} f_x & 0 & c_x \\ 0 & f_y & c_y \\ 0 & 0 & 1 \end{bmatrix}$$

indicates an internal parameter matrix of the camera; $f_x$ and $f_y$ respectively indicate the focal distances of the image in x direction and y direction; the unit is the pixel; $(c_x, c_y)$ indicates the principal point position of the camera, i.e., the corresponding position of the camera center on the image;

$$X = \begin{bmatrix} X \\ Y \\ 1 \end{bmatrix}$$

is a coordinate in the normal coordinate system; the normal coordinate system corresponding to the pixel points is calculated, i.e., $X=K^{-1}u$, through the known pixel coordinate system of the image and the internal parameters of the camera;
removing image distortion,
wherein the radial distortion of the image is described as follows:

$$x_d = x(1+k_1 r^2 + k_2 r^4 + k_3 r^6)$$

$$y_d = y(1+k_1 r^2 + k_2 r^4 + k_3 r^6)$$

wherein $r^2 = x2+y^2$, $k_1$, $k_2$ and $k_3$ are radial distortion parameters;
wherein the tangential distortion of the image is described as follows:

$$x_d = x + (2p_1 xy + p_2(r^2+2x^2))$$

$$y_d = y + (p_1(r^2+2y^2) + 2p_2 xy)$$

wherein $p_1$ and $p_2$ are tangential distortion coefficients;
wherein the coordinate relationship before and after distortion is as follows:

$$x_d = x(1+k_1 r^2 + k_2 r^4 + k_3 r^6) + (2p_1 xy + p_2(r^2+2x^2))$$

$$y_d = y(1+k_1 r^2 + k_2 r^4 + k_3 r^6) + (p_1(r^2+2y^2) + 2p_2 xy), \text{ and}$$

wherein $(x,y)$ is a normal coordinate in an ideal state, and $(x_d, y_d)$ is an actual normal coordinate with distortion;
reversing the two images according to the original rotation relationship between the two cameras, wherein an original rotation matrix R and a translation vector t between the two cameras are known:

$$X_r = RX_l + t$$

wherein $X_l$ indicates the normal coordinate of the infrared camera, and $X_r$ indicates the normal coordinate of the visible light camera; and the infrared image is rotated to positive direction of R by half an angle, and the visible light image is rotated to opposite direction of R by half an angle; and
restoring the de-distorted and rotated image to the pixel coordinate system according to the formula $u=KX$.

3. The multispectral camera external parameter self-calibration algorithm based on edge features according to claim 1, wherein judging an optimal corresponding position of the infrared image on the visible light image further comprises calculating a cross correlation coefficient of a visible light edge image and an infrared edge image by using a normalized cross-correlation matching method;

$$\rho(u,v) = \frac{\sum_{i=0}^{M} \sum_{j=0}^{N} (Im_{Oeu,v}(i,j) - Im_{IRe}(i,j))}{\sigma_{O_{u,v}} \sigma_{IR}}$$

wherein $(u,v)$ indicates the position of the infrared edge image $Im_{IRe}$ relative to the visible light edge image $Im_{Oe}$; and $Im_{Oeu,v}$ indicates a part of $Im_{Oe}$ taking $(u,v)$ as a starting point and having the same size as $Im_{IRe}$; $\sigma_{O_{u,v}}$ and $\sigma_{IR}$ indicate standard deviations of corresponding images; and
selecting a group of points $\{(u_k, v_k)\}$ that maximize $\{\rho(u,v)\}$ as candidate corresponding positions;
rotating each candidate position for multiple times according to an angle range; and
selecting the corresponding position and rotation angle that maximize $\rho(u,v)$.

4. The multispectral camera external parameter self-calibration algorithm based on edge features according to claim 1, wherein said extracting and selecting an optimal matching point pair further comprises:
selecting the optimal corresponding position of the infrared image on the visible light image;
translating and rotating the infrared image according to the result of said judging an optimal corresponding position of the infrared image on the visible light image;
then detecting the feature points on the visible light image and the translated and rotated infrared image respectively;
dividing the infrared image and visible light image areas into m×n blocks at the same time;
for each feature point $p_i^l$ of the infrared image, finding a corresponding block $b_{x_i, y_i}^l$ of the feature point in the infrared image; recording the search range of the visible light image corresponding to the block $b_{x_i, y_i}^l$ as $\{P_i^r\}$;
finding a variable which can describe the similarity of the feature points to assess the similarity of any point $p_i^l$ and $\{P_i^r\}$; if a maximum similarity is greater than a threshold $t_1$, regarding the point as a rough matching point $p_i^r$;
if the maximum similarity $s_{first}$ and the second maximum similarity $s_{second}$ in $p_i^l$ and $\{P_i^r\}$ satisfy:

$$F(s_{first}, s_{second}) \geq t_2$$

reserving the matching, wherein $t_2$ is a threshold and $F(s_{first}, s_{second})$ is used for describing a relationship between $s_{first}$ and $s_{second}$;

after selection according to the rule, matching the corresponding feature point $p'^l_i$ of $p^r_i$ in the infrared image; and reserving the matching $\{p^l_i, p^r_i\}$ if $p'^l_i = p^l_i$ is satisfied;

based on the infrared image feature point $p^l_i = (x^l_i, y^l_i)$, conducting parabolic fitting to optimize an integer pixel feature point $p^r_i = (x^r_i, y^r_i)$ corresponding to the visible light image, to obtain a sub-pixel feature point $p'^r_i = (x^r_i + j_{rx}^*, y^r_i + j_{ry}^*)$ corresponding to the visible light image, wherein $j_{rx}^*$ is a sub-pixel offset in x direction and $j_{ry}^*$ is a sub-pixel offset in y direction;

based on the integer pixel feature point $p^r_i = (x^r_i, y^r_i)$ corresponding to the visible light image, calculating the sub-pixel feature point $p'^l_i = (x^l_i + j_{lx}^*, y^l_i + j_{ly}^*)$ corresponding to the infrared image according to the method of 4-4), wherein $j_{lx}^*$ is a sub-pixel offset in x direction and $j_{ly}^*$ is a sub-pixel offset in y direction; and obtaining a final matching point pair as $\{p'^l_i, p'^r_i\}$; and restoring $p'^l_i$ to the coordinates before rotation and translation of the infrared image according to the inverse process of said electing the optimal corresponding position of the infrared image on the visible light image.

5. The multispectral camera external parameter self-calibration algorithm based on edge features according to claim 3, wherein said extracting and selecting an optimal matching point pair further comprises:

selecting the optimal corresponding position of the infrared image on the visible light image;

translating and rotating the infrared image according to the result of said judging an optimal corresponding position of the infrared image on the visible light image;

then detecting the feature points on the visible light image and the translated and rotated infrared image respectively;

dividing the infrared image and visible light image areas into m×n blocks at the same time;

for each feature point $p^l_i$ of the infrared image, finding a corresponding block $b^l_{x_i, y_i}$ of the feature point in the infrared image; recording the search range of the visible light image corresponding to the block $b^l_{x_i, y_i}$ as $\{P^r_i\}$, finding a variable which can describe the similarity of the feature points to assess the similarity of any point in $p^l_i$ and $\{P^r_i\}$; if a maximum similarity is greater than a threshold $t_1$, regarding the point as a rough matching point $p^r_i$, if the maximum similarity $s_{first}$ and the second maximum similarity $s_{second}$ in $p^l_i$ and $\{p^r_i\}$ satisfy:

$$F(s_{first}, s_{second}) \geq t_2$$

reserving the matching, wherein $t_2$ is a threshold and $F(s_{first}, s_{second})$ is used for describing a relationship between and $s_{first}$ and $s_{second}$;

after selection according to the rule, matching the corresponding feature point $p'^l_i$ of $p^r_i$ in the infrared image;

reserving the matching $\{p^l_i, p^r_i\}$ if $p'^l_i = p^l_i$ is satisfied;

based on the infrared image feature point $p^l_i = (x^l_i, y^l_i)$, conducting parabolic fitting to optimize an integer pixel feature point $p^r_i = (x^r_i, y^r_i)$ corresponding to the visible light image, to obtain a sub-pixel feature point $p'^r_i =$ $(x^r_i + j_{rx}^*, y^r_i + j_{ry}^*)$ corresponding to the visible light image, wherein $j_{rx}^*$ is a sub-pixel offset in x direction and $j_{ry}^*$ is a sub-pixel offset in y direction;

based on the integer pixel feature point $p^r_i = (x^r_i, y^r_i)$ corresponding to the visible light image, calculating the sub-pixel feature point $p'^l_i = (x^l_i + j_{lx}^*, y^l_i + j_{ly}^*)$ corresponding to the infrared image according to the method of 4-4), wherein $j_{lx}^*$ is a sub-pixel offset in x direction and $j_{ly}^*$ is a sub-pixel offset in y direction; and obtaining a final matching point pair as $\{p'^l_i, p'^r_i\}$; and restoring $p'^l_i$ to the coordinates before rotation and translation of the infrared image according to the inverse process of said electing the optimal corresponding position of the infrared image on the visible light image.

6. The multispectral camera external parameter self-calibration algorithm based on edge features according to claim 1, wherein said correcting the calibration result further comprises:

further screening the point pairs by using random sample consensus;

solving a basic matrix F and an essential matrix E, wherein a relationship between the pixel points $u_l$ and $u_r$ corresponding to infrared light and visible light and the basic matrix F is:

$$u_r^T F u_l = 0;$$

substituting the coordinates of the corresponding points into the above formula to construct a homogeneous linear equation system to solve F, wherein a relationship between the basic matrix and the essential matrix is:

$$E = K_r^T F K_l$$

wherein $K_l$ and $K_r$ are respectively the internal parameter matrices of the infrared camera and the visible light camera;

decomposing a relationship between rotation and translation from the essential matrix, wherein the relationship between the essential matrix E and rotation R and translation t is as follows:

$$E = [t]_x R$$

wherein $[t]_x$ indicates a cross product matrix of t;

conducting singular value decomposition on E to obtain:

$$E = U\Sigma V^T = U \begin{bmatrix} 1 & 0 & 0 \\ 0 & 1 & 0 \\ 0 & 0 & 0 \end{bmatrix} V^T$$

defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

writing E in the following two forms;

$$E = UZU^T UWV^T \quad (1)$$

setting $[t]_x = -UZU^T, R = UW^T V^T$ $$E = -UZU^T UW^T V^T \quad (2)$$

setting $[t]_x = -UZU^T, R = UW^T V^T$ superimposing the decomposed relationship between rotation and translation into the original positional relationship between the infrared camera and the visible light camera.

7. The multispectral camera external parameter self-calibration algorithm based on edge features according to claim 3, wherein said correcting the calibration result further comprises:

further screening the point pairs by using random sample consensus;

solving a basic matrix F and an essential matrix E, wherein a relationship between the pixel points $u_l$ and $u_r$ corresponding to infrared light and visible light and the basic matrix F is:

$u_r^T F u_l = 0;$ substituting the coordinates of the corresponding points into the above formula to construct a homogeneous linear equation system to solve F;

wherein a relationship between the basic matrix and the essential matrix is:

$E = K_r^T F K_l$ wherein $K_l$ and $K_r$ are respectively the internal parameter matrices of the infrared camera and the visible light camera;

decomposing a relationship between rotation and translation from the essential matrix, wherein the relationship between the essential matrix E and rotation R and translation t is as follows:

$E = [t]_x R$ wherein $[t]_x$ indicates a cross product matrix of t;

conducting singular value decomposition on E to obtain:

$$E = U\Sigma V^T = U \begin{bmatrix} 1 & 0 & 0 \\ 0 & 1 & 0 \\ 0 & 0 & 0 \end{bmatrix} V^T$$

defining two matrices:

$$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

writing E in the following two forms:

$E = UZU^T UWV^T$ (1)

$\text{setting}[t]_x = -UZU^T, R = UW^T V^T$ $E = -UZU^T UW^T V^T$ (2)

$\text{setting}[t]_x = -UZU^T, R = UW^T V^T$ superimposing the decomposed relationship between rotation and translation into the original positional relationship between the infrared camera and the visible light camera.

8. The multispectral camera external parameter self-calibration algorithm based on edge features according to claim 4, wherein the said correcting the calibration result further comprises:

further screening the point pairs by using random sample consensus;

solving a basic matrix F and an essential matrix E, wherein a relationship between the pixel points $u_l$ and $u_r$ corresponding to infrared light and visible light and the basic matrix F is:

$u_r^T F u_l = 0;$ substituting the coordinates of the corresponding points into the above formula to construct a homogeneous linear equation system to solve F;

wherein a relationship between the basic matrix and the essential matrix is:

$E = K_r^T F K_l$ wherein $K_l$ and $K_r$ are respectively the internal parameter matrices of the infrared camera and the visible light camera;

decomposing a relationship between rotation and translation from the essential matrix, wherein the relationship between the essential matrix E and rotation R and translation t is as follows:

$E = [t]_x R$ wherein $[t]_x$ indicates a cross product matrix of t;

conducting singular value decomposition on E to obtain:

$$E = U\Sigma V^T = U \begin{bmatrix} 1 & 0 & 0 \\ 0 & 1 & 0 \\ 0 & 0 & 0 \end{bmatrix} V^T$$

defining two matrices:

$$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

writing E in the following two forms:

$E = UZU^T UWV^T$ (1)

$\text{setting}[t]_x = -UZU^T, R = UW^T V^T$ $E = -UZU^T UW^T V^T$ (2)

$\text{setting}[t]_x = -UZU^T, R = UW^T V^T$ superimposing the decomposed relationship between rotation and translation into the original positional relationship between the infrared camera and the visible light camera.

\* \* \* \* \*